(12) United States Patent
Ishida et al.

(10) Patent No.: US 9,945,665 B2
(45) Date of Patent: Apr. 17, 2018

(54) SURVEYING INSTRUMENT

(71) Applicant: Kabushiki Kaisha TOPCON, Tokyo-to (JP)

(72) Inventors: Takeshi Ishida, Tokyo-to (JP); Nobuyuki Nishita, Tokyo-to (JP); Jumpei Kochi, Tokyo-to (JP); Goro Iwasaki, Tokyo-to (JP); Hiroyuki Nakabe, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 316 days.

(21) Appl. No.: 14/740,592

(22) Filed: Jun. 16, 2015

(65) Prior Publication Data
US 2016/0010985 A1 Jan. 14, 2016

(30) Foreign Application Priority Data

Jul. 9, 2014 (JP) .................................. 2014-141307

(51) Int. Cl.
*G01C 1/04* (2006.01)
*G01C 17/34* (2006.01)
*G01C 15/00* (2006.01)

(52) U.S. Cl.
CPC ............. *G01C 1/04* (2013.01); *G01C 15/002* (2013.01); *G01C 17/34* (2013.01)

(58) Field of Classification Search
CPC ......... G01C 17/34; G01C 1/04; G01C 15/002
See application file for complete search history.

(56) References Cited

U.S. PATENT DOCUMENTS 5,311,203 A * 5/1994 Norton ................. G02B 27/025
33/355 R
6,034,722 A 3/2000 Viney et al.
(Continued)

FOREIGN PATENT DOCUMENTS

CN 101769741 A 7/2010
CN 103134483 A 6/2013
(Continued)

OTHER PUBLICATIONS

Notice of Allowance dated Dec. 15, 2016 in co-pending U.S. Appl. No. 14/740,578.
(Continued)

*Primary Examiner* — Eric L Bolda
(74) *Attorney, Agent, or Firm* — Nields, Lemack & Frame, LLC

(57) ABSTRACT

The invention provides a surveying instrument comprising a frame unit rotatable in a horizontal direction, a telescope unit as mounted rotatably in a vertical direction on the frame unit, a driving unit for rotating and driving the frame unit and the telescope unit, a horizontal angle measuring unit for detecting a horizontal angle of the frame unit, a vertical angle measuring unit for detecting a vertical angle of the telescope unit and a control device, wherein the telescope unit has a telescope for sighting an object to be measured and a wide angle camera having a wider field angle than the telescope and for acquiring an image in a sighting direction, wherein the wide angle camera is set so that a sighting position of the sun is on a photodetection element and the sighting position of the sun is at a known position deviated from a field of view of the telescope, wherein the control device detects an image of the sun and a center of the image of the sun from an image acquired by the wide angle camera and controls the driving unit so that the center of the sun coincides with the sighting position of the sun, and is (Continued)

adapted to determine a true north based on a time moment, a horizontal angle, a vertical angle, a deviation between an optical axis of the telescope and the sighting position of the sun, and a latitude and a longitude of a position where the surveying instrument is installed, when the center of the image of the sun coincides with the sighting position of the sun.

5 Claims, 3 Drawing Sheets

(56) References Cited

U.S. PATENT DOCUMENTS

| | | | |
|---|---|---|---|
| 9,255,796 B2 | 2/2016 | Kodaira et al. | |
| 9,273,960 B2 | 3/2016 | Kumagai et al. | |
| 9,482,532 B2 | 11/2016 | Kumagai et al. | |
| 9,618,340 B2 | 4/2017 | Ishida et al. | |
| 2008/0017784 A1* | 1/2008 | Hoot | G01S 3/7861 250/203.4 |
| 2009/0241358 A1* | 10/2009 | Ohtomo | G01C 15/002 33/275 R |
| 2010/0283840 A1* | 11/2010 | Belenkii | G01C 21/02 348/61 |
| 2012/0116711 A1* | 5/2012 | Bruns | G01C 21/025 702/150 |
| 2012/0133918 A1 | 5/2012 | Sakimura et al. | |
| 2014/0022539 A1 | 1/2014 | France | |
| 2014/0039855 A1* | 2/2014 | Rachlin | G02B 23/00 703/6 |
| 2015/0042793 A1* | 2/2015 | Belenkii | G01S 3/7867 348/143 |
| 2015/0043007 A1 | 2/2015 | Kwiatkowski et al. | |
| 2016/0010987 A1 | 1/2016 | Ishida et al. | |
| 2016/0102977 A1 | 4/2016 | Ishida et al. | |

FOREIGN PATENT DOCUMENTS

| | | |
|---|---|---|
| JP | 2003-240548 A | 8/2003 |
| JP | 2007-327862 A | 12/2007 |
| WO | 2013/127908 A1 | 9/2013 |

OTHER PUBLICATIONS

"Sonnenazimut," Wikipedia: The Free Encyclopedia, https://de.wikipedia.org/Tachymeter_(Geodäsie), accessed Jun. 28, 2017.

"Tachymeter (Geodäsie)," Wikipedia: The Free Encyclopedia, https://de.wikipedia.org/wiki/Sonnenazimut, accessed Jun. 28, 2017.

* cited by examiner

SURVEYING INSTRUMENT

BACKGROUND OF THE INVENTION

The present invention relates to a surveying instrument, by which it is possible to perform a surveying operation automatically on true north.

In a case where a surveying instrument is installed for the purpose of performing a surveying operation, the true north is measured for setting a sighting direction of the surveying instrument. As one of the methods to determine azimuth at a position of installation, a method is known, by which the true north is surveyed by utilizing the sun.

When a position (latitude and longitude) where the surveying instrument is installed is already known, a sighting is performed from the position of installation toward the sun by using a telescope. A directional angle of the sun when the sighting is performed is obtained, and the true north can be surveyed based on the directional angle and time moment when sighting is performed.

It is dangerous to sight the sun directly. And when sighting is performed based on an image of an image pickup element acquired through a telescope, a big burden is imposed on the image pickup element. For this reason, normally, sighting is performed on the sun by mounting a filter on the telescope and attenuating the light by means of the filter.

In a normal surveying operation of the surveying instrument, a filter for light attenuation is not necessary and the filter is mounted for performing a true north surveying. Therefore, to perform the true north surveying, there have been problems in that a filter for light attenuation must be prepared and the filter for light attenuation must be mounted on the surveying instrument without forgetting.

SUMMARY OF THE INVENTION

It is an object of the present invention to provide a surveying instrument, by which it is possible to perform a true north surveying in a safe and in a reliable manner even in a case where mounting of a filter for light attenuation is forgotten, when the true north surveying is performed.

To attain the object as described above, a surveying instrument according to the present invention comprises a frame unit rotatable in a horizontal direction, a telescope unit as mounted rotatably in a vertical direction on the frame unit, a driving unit for rotating and driving the frame unit and the telescope unit, a horizontal angle measuring unit for detecting a horizontal angle of the frame unit, a vertical angle measuring unit for detecting a vertical angle of the telescope unit and a control device, wherein the telescope unit has a telescope for sighting an object to be measured and a wide angle camera having a wider field angle than the telescope and for acquiring an image in a sighting direction, wherein the wide angle camera is set so that a sighting position of the sun is on a photodetection element and the sighting position of the sun is at a known position deviated from a field of view of the telescope, wherein the control device detects an image of the sun and a center of the image of the sun from an image acquired by the wide angle camera and controls the driving unit so that the center of the sun coincides with the sighting position of the sun, and is adapted to determine a true north based on a time moment, a horizontal angle, a vertical angle, a deviation between an optical axis of the telescope and the sighting position of the sun, and a latitude and a longitude of a position where the surveying instrument is installed, when the center of the image of the sun coincides with the sighting position of the sun.

Further, in the surveying instrument according to the present invention, the control device sets up a route so that the route, where the center of the image of the sun coincides with the sighting position of the sun does not pass through the field of view of the telescope on the photodetection element.

Furthermore, in the surveying instrument according to the present invention, the telescope unit has a shutter and the control device has a normal surveying mode for measuring an object to be measured through the telescope and a true north surveying mode for performing a true north surveying using the wide angle camera, wherein it is so arranged that in a case where the true north surveying mode is selected, an optical path of the telescope is intercepted by the shutter.

According to the present invention, the surveying instrument comprises a frame unit rotatable in a horizontal direction, a telescope unit as mounted rotatably in a vertical direction on the frame unit, a driving unit for rotating and driving the frame unit and the telescope unit, a horizontal angle measuring unit for detecting a horizontal angle of the frame unit, a vertical angle measuring unit for detecting a vertical angle of the telescope unit and a control device, wherein the telescope unit has a telescope for sighting an object to be measured and a wide angle camera having a wider field angle than the telescope and for acquiring an image in a sighting direction, wherein the wide angle camera is set so that a sighting position of the sun is on a photodetection element and the sighting position of the sun is at a known position deviated from a field of view of the telescope, wherein the control device detects an image of the sun and a center of the image of the sun from an image acquired by the wide angle camera and controls the driving unit so that the center of the sun coincides with the sighting position of the sun, and is adapted to determine a true north based on a time moment, a horizontal angle, a vertical angle, a deviation between an optical axis of the telescope and the sighting position of the sun, and a latitude and a longitude of a position where the surveying instrument is installed, when the center of the image of the sun coincides with the sighting position of the sun. As a result, it becomes possible to perform the true north surveying without a surveying operator sighting the sun, which improves a working efficiency and safety.

Further, according to the present invention, in the surveying instrument, the control device sets up a route so that the route, where the center of the image of the sun coincides with the sighting position of the sun does not pass through the field of view of the telescope on the photodetection element. As a result, an incoming of a strong light through the telescope is prevented, safety is improved and the photodetection element picked up through the telescope is protected.

Furthermore, according to the present invention, in the surveying instrument, the telescope unit has a shutter and the control device has a normal surveying mode for measuring an object to be measured through the telescope and a true north surveying mode for performing a true north surveying using the wide angle camera, wherein it is so arranged that in a case where the true north surveying mode is selected, an optical path of the telescope is intercepted by the shutter. As a result, the sun cannot be sighted by the telescope, safety is improved, the incoming of the strong light through the telescope is prevented, and the photodetection element picked up through the telescope is protected.

DETAILED DESCRIPTION OF THE PREFERRED EMBODIMENT

Description will be given below on an embodiment of the present invention by referring to the attached drawings.

Figure 1:
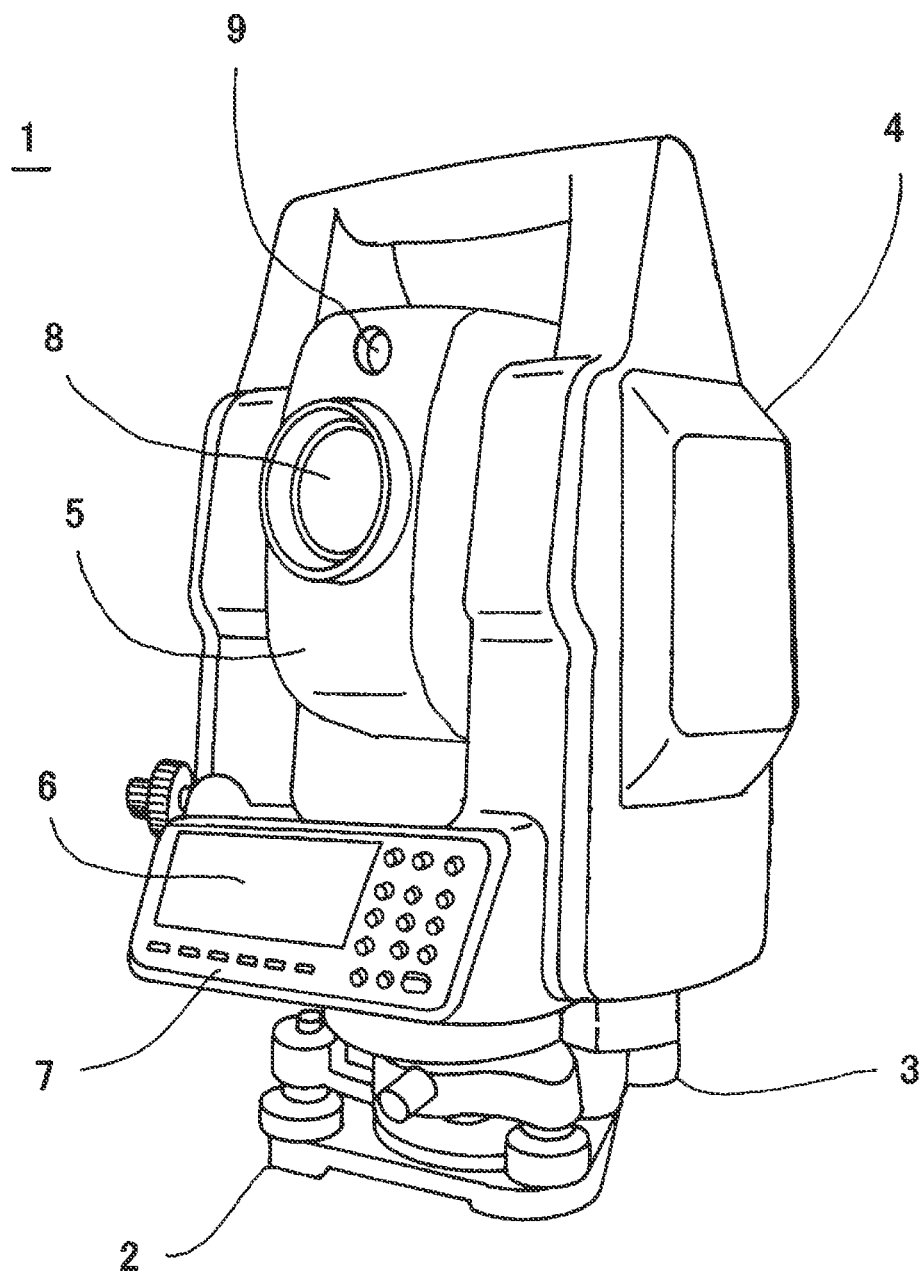
FIG. 1 is a schematical external view of a surveying instrument according to an embodiment of the present invention.
Figure 2:
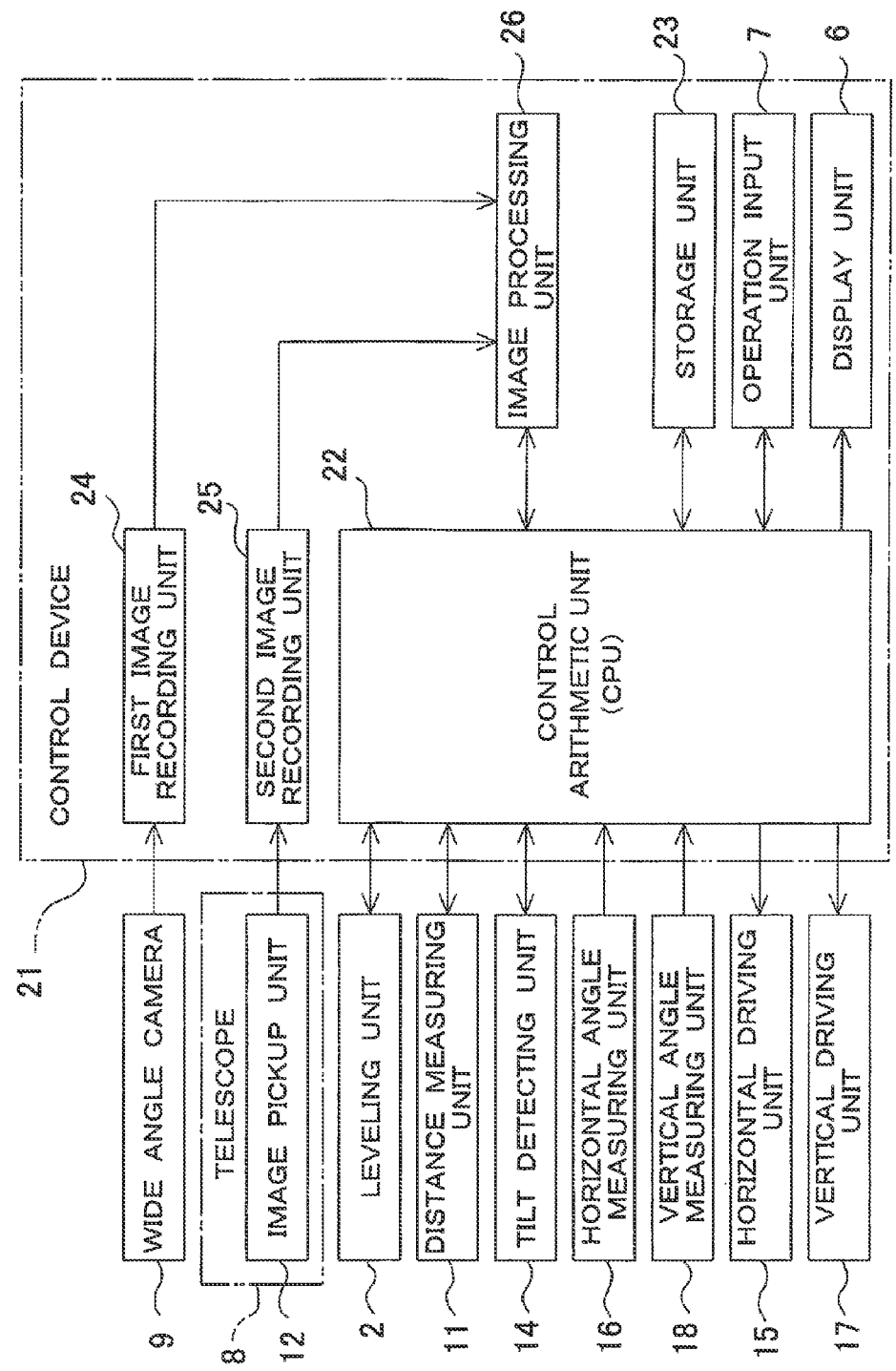
FIG. 2 is a block diagram to show an approximate arrangement of the surveying instrument.

FIG. 1 and FIG. 2 shows a surveying instrument 1, to which the present invention is applied. It is to be noted that the surveying instrument 1 as used is a total station, for instance, and has a tracking function. A pulsed laser beam is projected towards a measuring point as a distance measuring light, a reflected light (hereinafter referred as "a reflection light") of the distance measuring light from the measuring point is received, and a distance is measured for each pulse of the light. By taking an average value of the results of distance measurement, the measurement of distance is performed with high precision.

As shown in FIG. 1, the surveying instrument 1 primarily comprises a leveling unit 2 mounted on a tripod (not shown), a base unit 3 mounted on the leveling unit 2, a frame unit 4 rotatably mounted around a vertical axis as a center on the base unit 3 and a telescope unit 5 rotatably mounted around a horizontal axis as a center on the frame unit 4.

The frame unit 4 comprises a display unit 6 and an operation input unit 7. The telescope unit 5 has a telescope 8 for sighting an object to be measured and a distance measuring unit 11, which commonly shares an optical system of the telescope 8. Further, the telescope unit 5 has an image pickup unit 12 for acquiring an image in a sighting direction through the optical system of the telescope 8. Also, the telescope unit 5 comprises a wide angle camera 9. The wide angle camera 9 has an optical axis running in parallel to an optical axis of the telescope 8, and can acquire a wide angle image in the sighting direction or in an approximately sighting direction of the telescope 8.

A field angle of the telescope 8 is 1°, for instance, and a field angle of the wide angle camera 9 is 15° to 30°, for instance. Further, although the optical axis of the telescope 8 is different from the optical axis of the wide angle camera 9, a distance between these optical axes is already known, and a deviation of the sighting direction between the wide angle camera 9 and the telescope 8 can be corrected by calculation.

Each of the wide angle camera 9 and the image pickup unit 12 outputs a picked up image as a digital image signal. Photodetection element of each of the wide angle camera 9 and the image pickup unit 12 is a CCD, a CMOS, etc., for instance, which is an aggregate of pixels and so arranged that a position of the pixel to be received can be specified and that a field angle can be detected from the position of the pixel to be received.

Referring to FIG. 2, description will be given on a basic arrangement of the surveying instrument 1.

As described above, the telescope unit 5 houses the distance measuring unit 11, which commonly shares an optical system of the telescope 8. The distance measuring unit 11 emits a pulsed laser beam as a distance measuring light through the optical system and receives a reflection light from an object to be measured through the optical system, and performs an electro-optical distance measurement to the object to be measured based on the reflection light as received.

In a case where the object to be measured is a prism, the distance measuring unit 11 can perform measurement in a prism measurement mode. Further, in a case where the object to be measured is not a prism, the distance measuring unit 11 can perform measurement in a non-prism measurement mode. And a measurement mode can be switched over corresponding to the object to be measured.

On the frame unit 4, a horizontal driving unit 15 for rotating the frame unit 4 in a horizontal direction is provided, and a horizontal angle measuring unit 16 for detecting a horizontal rotation angle and for detecting a horizontal angle of a sighting direction is provided with respect to the base unit 3 of the frame unit 4. Further, on the frame unit 4, a vertical driving unit 17 is provided, which rotates around the telescope unit 5 with a horizontal axis as a center and a vertical angle measuring unit 18 is provided, which detects a vertical angle of the telescope unit 5 and measures a vertical angle in the sighting direction.

Further, on the frame unit 4, a tilt detecting unit 14 is provided and the tilt detecting unit 14 detects a tilt or a horizontality of the frame unit 4.

A control device 21 is housed in the frame unit 4. Based on a detection result of the tilt detecting unit 14, the control device 21 controls the leveling unit 2 and levels the frame unit 4 in a horizontal direction.

Further, the control unit 21 controls the driving of the horizontal driving unit 15 and rotates the frame unit 4 in a horizontal direction, and further, controls the driving of the vertical driving unit 17 and rotates the telescope unit 5 in an elevation direction. By cooperative movement of a rotation in the horizontal direction and a rotation in the elevation direction, the telescope unit 5 is directed towards a predetermined direction.

Further, the control device 21 tracks, detects and executes the true north surveying of the sun based on the image acquired by the wide angle camera 9 and controls to track the object to be measured based on the image acquired by the image pickup unit 12. Further, based on the image acquired by the wide angle camera 9 and on the image acquired by the image pickup unit 12, the control device 21 carries out a searching for capturing the object to be measured in the image (in a field of view of a telescope) before starting the tracking, or in a case where the object to be measured is deviated from the image while tracking, the searching for capturing in the image again is carried out.

Further, the control device 21 performs distance measurement at a predetermined measuring point by controlling the distance measuring unit 11 in a standstill condition or while tracking.

Referring to FIG. 2, further description will be given on the control device 21.

The control device 21 is made up of a control arithmetic unit 22, a storage unit 23, a first image recording unit 24 for recording images acquired by the wide angle camera 9, a second image recording unit 25 for recording images acquired by the image pickup unit 12, an image processing unit 26 for performing image processing such as a specifying of a measuring point or an object to be measured based on the image acquired by the wide angle camera 9 and the image acquired by the image pickup unit 12, the display unit 6 for displaying measurement results and measurement conditions, and the operation input unit 7 for inputting various types of commands such as measurement embodiment starting or the like or for inputting data necessary for the measurement.

In the storage unit 23, various types of programs are stored. These programs include: a sequence program for executing the measurement, an image display program for displaying on the image processing unit 26, a calculation program for executing calculations necessary for the measurement, an image processing program for performing image processing on the images acquired by the wide angle camera 9 and the image pickup unit 12, a true north surveying program for calculating the position of the sun from the images as processed and executing the true north surveying, a distance measuring program for measuring a distance to the measuring point and for measuring the distance by tracking the object to be measured, a searching program for capturing the object to be measured in the images, and other programs.

Further, the results of measurement are inputted to the control arithmetic unit 22 from the distance measuring unit 11, the horizontal angle measuring unit 16 and the vertical angle measuring unit 18. The control arithmetic unit 22 is adapted to execute the measurement of distance, the vertical angle and the horizontal angle according to the sequence program, the arithmetic program, the distance measuring program, etc., and is adapted to store the results of measurement in the storage unit 23 and to display the results of measurement on the display unit 6 according to the image display program or the like.

The image processing program makes the image processing unit 26 to execute an image processing such as an extraction of the measuring point or the object to be measured based on the image acquired by the wide angle camera 9 and the image acquired by the image pickup unit 12.

Further, the control arithmetic unit 22 is capable of executing a normal surveying mode with respect to the object to be measured according to the distance measurement program and a true north surveying mode to perform the true north surveying according to the true north surveying program. By selecting a surveying mode from the operation input unit 7, a measurement as required can be executed.

Description will be given below on an operation in a case where the true north surveying is performed by the surveying instrument 1 according to the present embodiment.

The surveying instrument 1 is installed at a known point, i.e. at a point where a latitude and a longitude are already known, and leveling is performed by the leveling unit 2. The latitude and the longitude of the position of installation are inputted to the control device 21 by the operation input unit 7. It is to be noted that in a case where the surveying instrument 1 is provided with a GPS, an installation coordinate of the surveying instrument 1 is obtained from the GPS and the time moment of measurement may be obtained from the GPS.

The true north surveying mode is selected by the operation input unit 7.

The telescope unit 5 is directed towards the sun so that the wide angle camera 9 captures the sun. The sun can be captured by the wide angle camera 9 if the direction is approximately adequate since a field of view of the wide angle camera 9 is wide.

Figure 3:
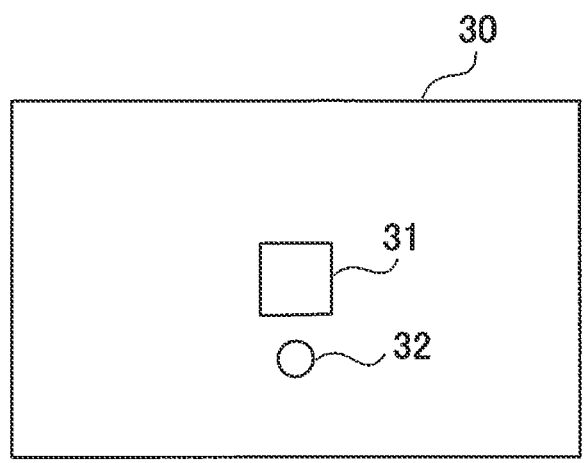
FIG. 3 is an explanatory drawing to show a relationship between a field of view of a telescope on a photodetection element of a wide angle camera and a sighting position of the sun in the present embodiment.

In a case where the true north surveying mode is selected, the sighting position, where the wide angle camera 9 sighted the sun, is set so as to deviate from the sighting position of the telescope 8 (i.e. the optical axis of telescope 8). As shown in FIG. 3, the relation between a sighting position of the sun of the wide angle camera 9 and the sighting position of the telescope 8 is such that an image 32 of the sun deviates entirely from a field of view 31 of the telescope 8. Further, a deviation amount of the sighting position of the sun from the sighting position of the telescope 8 is already known, and the amount is at least an amount, which is deviated from the field of view 31 of the telescope 8. Since the deviation amount between the sighting position of the sun and the sighting position of the telescope 8 is already known, the sighting position of the sun can be corrected so as to coincide with the sighting position of the telescope 8 by calculation.

FIG. 3 shows an image 30 of the wide angle camera 9, and shows a condition where the sun is finally sighted by the wide angle camera 9. The sighting position of the sun may be deviated in any direction with respect to the sighting position of the telescope 8, but is deviated in a vertical direction for the purpose of decreasing a calibration error of a horizontal angle because the accuracy of the horizontal angle is important in the true north surveying.

Further, in the true north surveying mode, it is so arranged that an image taken by the wide angle camera 9 is displayed on the display unit 6. And whether the sun is captured by the wide angle camera 9 or not can be distinguished by processing the image from the first image recording unit 24 by the image processing unit 26 and can also be easily confirmed from the image of the display unit 6.

The image processing unit 26 extracts the image 32 of the sun by processing an image from the first image recording unit 24 and detects the central position of the image 32 of the sun. The image processing unit 26 compares the central position of the image 32 of the sun with the sighting position of the sun, calculates the deviation amount and a deviation direction between the central position of the image 32 of the sun and the sighting position of the sun, and the calculation result is inputted to the control arithmetic unit 22.

Based on the deviation amount and the deviation direction as inputted from the image processing unit 26, the leveling unit 2 drives the horizontal driving unit 15 and the vertical driving unit 17 and coincides the position of the image 32 of the sun as detected with the sighting position of the sun. It is to be noted that since the positional relation with the sighting position of the telescope 8 can be obtained by calculation from the position of the image 32 of the sun on the image taken by the wide angle camera 9, during the process of coinciding the image 32 of the sun with the sighting position of the sun, the control device 21 performs rotation in such a manner that the sun does not enter the field of view 31 of the telescope 8.

The time moment when coincidence is made, a horizontal angle detected by the horizontal angle measuring unit 16 and a vertical angle detected by the vertical angle measuring unit 18 are captured.

Then, the true north is measured based on the time moment of when coincided, on the horizontal angle and the vertical angle as detected, and further, on the latitude and the longitude of the position of installation.

On the photodetection element of the wide angle camera 9, a range corresponding to the field of view 31 of the telescope 8 is set as a photodetection prohibiting zone.

The control arithmetic unit 22 calculates a route to move the central position of the image 32 of the sun to the sighting position of the sun from the central position of the sun and the sighting position of the sun.

Further, in a case where the central position of the sun on the photodetection element is coincided with the sighting position of the sun and in a case where the central position of the image 32 of the sun passes through the field of view 31 of the telescope 8 when moved by the shortest distance, the control arithmetic unit 22 calculates a route so as to reach the sighting position of the sun by avoiding the field of view 31 of the telescope 8 and performs driving and controlling on the horizontal driving unit 15 and the vertical angle measuring unit 18 based on the calculated route.

Or, an arbitrary shutter such as an electrical, a mechanical, etc. may be provided in an optical system of the telescope 8, and it may be so arranged that an optical path of the telescope 8 is intercepted in the true north surveying mode of the wide angle camera 9.

In the present embodiment, when the true north surveying is performed, by simply directing the wide angle camera 9 approximately towards the sun, the true north surveying can then be performed automatically. Further, the processing condition of the true north surveying and the result of the true north surveying can be confirmed by the display unit 6, and this contributes to the execution of higher efficiency. Further, even when the operator looks into the telescope 8 without care, it is safe because the sunlight does not enter the telescope 8.

By setting the true north surveying mode, incoming of a sunlight to the telescope 8 with high magnification can be prevented. As a result, the incoming of a strong light to a photodetection element of the image pickup unit 12 can be restrained, and deterioration and damage of the photodetection element can be prevented.

It is needless to say that, when normal surveying mode is selected by the operation input unit 7 at the start of the measurement, it is possible to perform a distance measurement and an angle measurement on an object to be measured or the measurement by tracking the object to be measured.

The invention claimed is:

1. A surveying instrument, comprising a frame unit rotatable in a horizontal direction, a telescope unit as mounted rotatably in a vertical direction on said frame unit, a driving unit for rotating and driving said frame unit and said telescope unit, a horizontal angle measuring unit for detecting a horizontal angle of said frame unit, a vertical angle measuring unit for detecting a vertical angle of said telescope unit and a control device, wherein said telescope unit has a telescope for sighting an object to be measured and a wide angle camera with an optical axis parallel to an optical axis of said telescope and with a wider field angle than said telescope, wherein said wide angle camera acquires an image of a sighting direction of said telescope, a range corresponding to a field of view of said telescope is set as a photodetection prohibiting zone on a photodetection element of said wide angle camera and a sighting position of the sun is set at a known position deviated from said photodetection prohibiting zone on said photodetection element of said wide angle camera, wherein said control device detects an image of the sun and a center of said image of the sun from an image acquired by said wide angle camera and controls said driving unit so that said center of the sun coincides with said sighting position of the sun, and is adapted to determine a true north based on a time moment, a horizontal angle, a vertical angle, a deviation between an optical axis of said telescope and said sighting position of the sun, and a latitude and a longitude of a position where said surveying instrument is installed, when the center of said image of the sun coincides with said sighting position of the sun.

2. A surveying instrument according to claim 1, wherein said control device sets up a route so that in said route, where the center of said image of the sun coincides with said sighting position of the sun does not pass through said photodetection prohibiting zone on said photodetection element.

3. A surveying instrument according to claim 1, wherein said telescope unit has a shutter and said control device has a normal surveying mode for measuring an object to be measured through said telescope and a true north surveying mode for performing a true north surveying using said wide angle camera, wherein it is so arranged that in a case where said true north surveying mode is selected, an optical path of said telescope is intercepted by said shutter.

4. A surveying instrument, comprising a frame unit rotatable in a horizontal direction, a telescope unit as mounted rotatably in a vertical direction on said frame unit, a driving unit for rotating and driving said frame unit and said telescope unit, a horizontal angle measuring unit for detecting a horizontal angle of said frame unit, a vertical angle measuring unit for detecting a vertical angle of said telescope unit and a control device, wherein said telescope unit has a telescope for sighting an object to be measured and a wide angle camera having a wider field angle than said telescope and for acquiring an image in a sighting direction, wherein said wide angle camera is set so that a sighting position of the sun is on a photodetection element and said sighting position of the sun is at a known position deviated from a field of view of said telescope, wherein said control device detects an image of the sun and a center of said image of the sun from an image acquired by said wide angle camera and controls said driving unit so that said center of the sun coincides with said sighting position of the sun, and is adapted to determine a true north based on a time moment, a horizontal angle, a vertical angle, a deviation between an optical axis of said telescope and said sighting position of the sun, and a latitude and a longitude of a position where said surveying instrument is installed, when the center of said image of the sun coincides with said sighting position of the sun, and wherein said control device sets up a route so that in said route, where the center of said image of the sun coincides with said sighting position of the sun does not pass through said field of view of said telescope on said photodetection element.

5. A surveying instrument, comprising a frame unit rotatable in a horizontal direction, a telescope unit as mounted rotatably in a vertical direction on said frame unit, a driving unit for rotating and driving said frame unit and said telescope unit, a horizontal angle measuring unit for detecting a horizontal angle of said frame unit, a vertical angle measuring unit for detecting a vertical angle of said telescope unit and a control device, wherein said telescope unit has a telescope for sighting an object to be measured and a wide angle camera having a wider field angle than said telescope and for acquiring an image in a sighting direction, wherein said wide angle camera is set so that a sighting position of the sun is on a photodetection element and said sighting position of the sun is at a known position deviated from a field of view of said telescope, wherein said control device detects an image of the sun and a center of said image of the sun from an image acquired by said wide angle camera and controls said driving unit so that said center of the sun coincides with said sighting position of the sun, and is adapted to determine a true north based on a time moment, a horizontal angle, a vertical angle, a deviation between an optical axis of said telescope and said sighting position of the sun, and a latitude and a longitude of a position where said surveying instrument is installed, when the center of said image of the sun coincides with said sighting position of the sun, wherein said telescope unit has a shutter and said control device has a normal surveying mode for measuring an object to be measured through said telescope and a true north surveying mode for performing a true north surveying using said wide angle camera, wherein it is so arranged that in a case where said true north surveying mode is selected, an optical path of said telescope is intercepted by said shutter.

* * * * *